March 8, 1960

O. S. MEIXELL 2,928,089

RADIO DIRECTION FINDING SYSTEM

Filed Jan. 10, 1958

Inventor
OLIVER S. MEIXELL
By Percy P. Lantzy
Attorney

March 8, 1960

O. S. MEIXELL 2,928,089

RADIO DIRECTION FINDING SYSTEM

Filed Jan. 10, 1958

Inventor
OLIVER S. MEIXELL

By
Attorney

United States Patent Office 2,928,089
Patented Mar. 8, 1960

2,928,089

RADIO DIRECTION FINDING SYSTEM

Oliver S. Meixell, Caldwell, N.J., assignor to International Telephone and Telegraph Corporation, Nutley, N.J., a corporation of Maryland Application January 10, 1958, Serial No. 708,331

13 Claims. (Cl. 343—113)

This invention refers to radio direction finders and more particularly to a direction finding system which will give a direct indication of the direction of arrival of pulsed electromagnetic signals.

Radio direction finders are generally of the amplitude comparison type in which an indicator is used to produce directional indication dependent upon the amplitude of signals received on two or more directive antennas from a transmitting source, the direction of which is to be determined. There are also direction finding systems in which the directive pattern is determined by the phase of energy received from two spaced antenna units by phase shifting the outputs of each antenna. There is always the problem of obtaining a bearing without quadrantal ambiguity and in such a way that the ability to obtain a bearing is independent of the value of the incoming radio frequency, the intensity of the received signals, the pulse width and the pulse repetition frequency, where the received signals are pulsed radiations. There is also the problem of obtaining the bearings instantaneously and without the necessity for scanning.

It is therefore an object of this invention to provide a direction finding system for pulsed radiation which is not dependent upon a directive antenna characteristic and the consequent amplitude of the received signal to obtain the correct bearing.

It is a further object that this direction finding system obtain such bearings in a manner independent of the values of the signal's radio frequency and intensity, its pulse width, and the pulse repetition frequency thereof.

It is still another object to provide a direction finding system for pulsed radiations whereby the bearing information can be stored and utilized after the receipt of such information.

A feature of this invention is a radio direction finding system to determine the angle of arrival of the front of pulsed electromagnetic radiations which has first and second spaced antennas to receive the front of pulsed radiations, means to convert the pulse output of the first and second antennas to first and second sinusoidal signals and means to obtain from these sinusoidal signals sum and difference voltages the ratio of the magnitudes of which is a function of the phase difference between the first and second sinusoidal signals. Means are provided to utilize said voltages to obtain an angular indication which has a given relationship to the time difference between the arrival of the front of a pulsed radiation at the first and second antennas, this time difference being a function of the angle of arrival of the front to the first and second antennas.

The above-mentioned and other features and objects of this invention will become more apparent by reference to the following description taken in conjunction with the accompanying drawings, in which.

Figure 1:
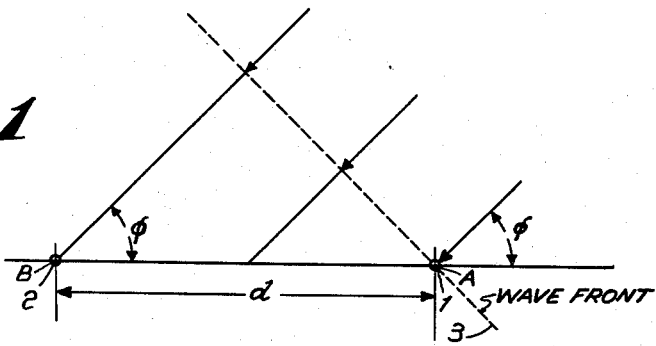
Fig. 1 is a diagram showing the geometrical relation between two spaced antennas and the front of pulsed radiations arriving at the antennas.

With reference to Fig. 1, two omnidirectional receiving antennas 1 and 2 are located at points A and B. A front of pulsed radiations shown by the broken line 3 is shown arriving at the antenna 1 at an angle $\phi$ with the line joining the two antennas 1 and 2. Electromagnetic waves in free space travel with the velocity of light, $c=3$ times $10^{10}$ cm./sec. Assume a front of pulsed radiations first strikes antenna 1 as shown in Fig. 1. This front will later strike antenna 2 at a time $\Delta t$ defined by:

$$\Delta t = \frac{d}{c} \cos \phi \qquad (1)$$

where $\Delta t$=time difference, $d$=the antenna separation between antennas 1 and 2, $c$=velocity of light, and $\phi$=direction of radiation. This relation shows that the difference in time of signal arrival is a function of the angle of signal arrival. If only the magnitude of this time difference is considered (i.e., $|\Delta t|$), it is evident that this magnitude is the same for four values of the angle of signal arrival at $\pm\phi$ and $180°\pm\phi$. Only at the specific values of $\phi=0°, 90°, 180°$, and $270°$ does this quadrantal ambiguity reduce to a $180°$ ambiguity as is obvious by reference to Equation 1.

At $\phi=0°$ and $180°$, the time difference is a maximum. Assuming 1,000 feet per microsecond as the propagation velocity, this maximum time difference is 2 microseconds for a 2,000-foot antenna separation. At an antenna separation of 100 feet, it is only 0.1 microsecond.

Equation 1 can also be written as:

$$\phi = \cos^{-1}\left(\frac{d}{c}\Delta t\right) \qquad (2)$$

For a given antenna separation $d$, this expresses the incoming angle of arrival as a function of time difference. It is necessary to devise a means for measuring this time difference $\Delta t$. Obviously, this should be determined so that we know which of the two antennas first intercepts the pulsed radiations front. By so doing, quadrantal ambiguities are reduced to a mirror image ambiguity $\pm\phi$ and there is no ambiguity at $\phi=0°$ and $180°$.

Figure 2A:
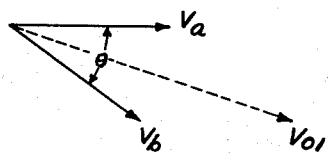
Figs. 2a and 2b are vector diagrams showing the sum and difference of two voltages.
Figure 2B:
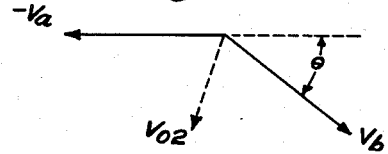

If demodulated pulses from the two spaced antennas 1 and 2 are fed into separate associated high-Q ringing circuits, there is produced as the output of these ringing circuits two damped sinusoidal voltages whose relative phase is a linear function of time difference. If the sum and difference of these voltages are then properly processed, they can be fed to deflection plates of a cathode ray tube to form a radial line display. The display angle thereby secured is a linear function of time difference and is independent of the value of the incoming radio frequency, the signal intensity, the pulse width, and the pulse repetition frequency. Consider the vector diagrams of Figs. 2a and 2b.

$$\bar{V}_{01} = \bar{V}_a + \bar{V}_b$$
$$= V_a + V_b \cos \theta - jV_b \sin \theta$$
$$\bar{V}_{02} = -\bar{V}_a + \bar{V}_b$$
$$= -V_a + V_b \cos \theta - jV_b \sin \theta$$

Let
$$V_a = V_b = V$$

Therefore, $\bar{V}_{01} = V(1+\cos \theta - j \sin \theta)$ and $\bar{V}_{02} = V(-1+\cos \theta - j \sin \theta)$ from which the magnitudes can be obtained $$V_{01} = \sqrt{2}\, V\sqrt{1+\cos \theta} \quad V_{02} = \sqrt{2}\, V\sqrt{1-\cos \theta}$$

The ratio of these resultants is $$\frac{V_{02}}{V_{01}} = \frac{\sqrt{1-\cos\theta}}{\sqrt{1+\cos\theta}} = \tan\frac{\theta}{2} \tag{3}$$

If $V_{02}$ and $V_{01}$ are individually rectified to their average or D.C. values, $V_{2(dc)}$ and $V_{1(dc)}$ and then applied to the Y and X plates of a cathode ray oscilloscope, a spot will be formed on the scope. A line from the origin through this spot is at an angle $\psi$ with the horizontal. Obviously, $$\tan\psi = \frac{V_{2(dc)}}{V_{1(dc)}} \tag{4}$$

but $$\frac{V_{2(dc)}}{V_{1(dc)}} = \frac{V_{02}}{V_{01}} \tag{5}$$

whence:

$$\tan\psi = \frac{V_{02}}{V_{01}} \tag{6}$$

substituting (3) in (6):

$$\tan\psi = \tan\frac{\theta}{2} \tag{7}$$

$$\psi = \frac{\theta}{2}$$

or $$\theta = 2\psi \tag{8}$$

Thus, the phase difference $\theta$ between the two voltage pairs $V_a$ and $V_b$ is equal to twice the angle $\psi$ displayed on the scope. It thus affords a display whose angular position $\psi$ varies linearly from 0° to 90° with a phase difference change $\theta$ from 0° to 180°. If $V_a$ and $V_b$ each carry a cophasal modulation, the display is in the form of a radial trace at an angle $\psi$. This trace is the locus of the modulation variations.

Figure 3:
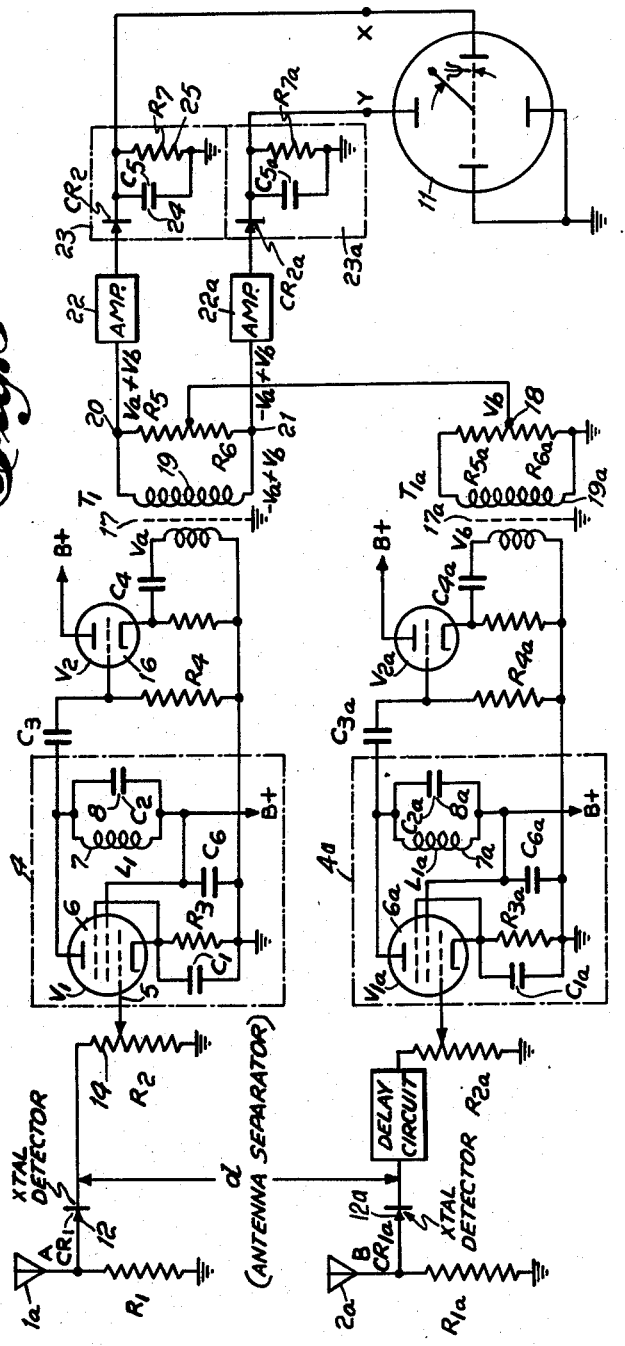
Fig. 3 is a schematic diagram of one embodiment of this invention having a cathode ray display of the desired information.

Consider the schematic for a shock excited oscillator 4 as shown in Fig. 3. A pulse applied to the grid 5 of a pentode tube 6 causes the paralleled inductance 7 and capacitance 8 combination to ring. Since this ringing circuit is in the output of the pentode 6, the damping effect of the plate resistance is low and a damped sinusoidal output is produced which has the form $$v = Kw_0 L \epsilon^{-\frac{w_0 t}{2Q_0}} \sin w_0 t \tag{9}$$

where:

$K =$ an amplitude coefficient
$w_0 = 2\pi f_0$ whereby $f_0$ is the ringing frequency $$\left(f_0 \approx \frac{1}{2\pi\sqrt{LC}}\right)$$

$L =$ inductance
$t =$ time
$Q_0 =$ equivalent Q-value of coil (including effects of the D.-C. resistance of the inductance coil, the plate resistance of the tube and the load)

For a $Q_0 = 160$ some 50 cycles of ringing will be produced before the damped sinusoid decays to about 37 percent of its initial amplitude. If the ratio of the magnitudes of two such damped sinusoids are taken (each from circuits having the same $w_0$ and $Q_0$), then the damping coefficient $$\epsilon^{-\frac{w_0 t}{2Q_0}}$$

cancels out.

Figure 5:
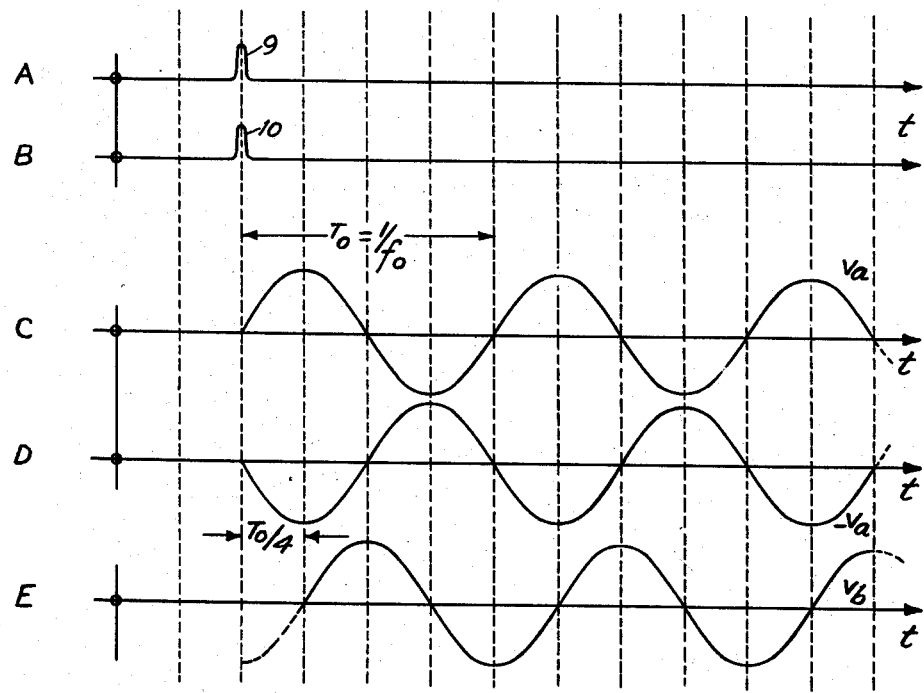
Fig. 5 is a graph of the waveforms at different positions in the circuitry of this information.

Refer to the waveforms illustrated in Fig. 5. Waveforms A and B represent two pulses 9 and 10 which initially are assumed to be time coincident. Let pulse 9 shock excite a ringing circuit such as 4 with the output circuit arranged so that the two sinusoids $V_a$, waveform C and $-V_a$, waveform D are obtained. Only a few cycles are illustrated and a small exponential decay of amplitude is assumed. Let pulse 10 shock excite a second ringing circuit 4a having the same parameters as the first, that is to say, the same inductance 7a, capacitance 8a, $Q_0$, and the same type of pentode. Before applying pulse 10, it is delayed by a time equal to $T_0/4$ or one-quarter cycle of the frequency $f_0$. The resultant sinusoid is $V_b$, waveform E in Fig. 5. The frequency of this wave is the same as that for the waveforms 5C and 5D. Neglecting the quarter-period delay in the formation of the waveform 5E, add the instantaneous amplitudes to form the outputs $v_{01} = v_a + v_b$ and $v_{02} = -v_a + v_b$ and then obtain the ratio of their magnitudes. It can be shown that since each of these sinusoids has a common damping factor, the steady-state formula for the ratio of magnitudes applies as shown in Equation 3. In this case since $\theta = 90°$ $$\left|\frac{v_{02}}{v_{01}}\right| = \frac{\sqrt{1-\cos 90°}}{\sqrt{1+\cos 90°}} = 1$$

To provide a visual indication of this, it is necessary only to rectify $v_{01}$ and $v_{02}$, filter to remove $f_0$, and apply the envelopes of the damped sinusoids to the horizontal and vertical plates of a cathode ray indicator tube 11. The display is in the form of a radial trace and in this case where $\theta = 90°$ $$\psi = \frac{\theta}{2} = 45°$$

according to Equation 7. The extent of the trace is governed by the peak amplitude of the envelopes, but the angle remains at 45° for as long as pulses 9 and 10 occur at the same instant.

Suppose pulse 10 were to occur $T_0/4$ sooner than pulse 9. This would cause the output of ringing circuit 4a, $V_b$, to be in phase with $V_a$ and out of phase with $-V_a$, or $\theta = 0$. Putting the value of $\theta = 0$ into Equation 3, we get $$\left|\frac{v_{02}}{v_{01}}\right| = \frac{\sqrt{1-\cos 0°}}{\sqrt{1+\cos 0°}} = 0$$

and the display angle $$\left(\psi = \frac{\theta}{2}\right) \text{ is } 0$$

Conversely let pulse 10 occur $T_0/4$ later than pulse 9. Under these conditions $v_b$ will be 180° out of phase with $v_a$ and in phase with $-v_a$. Therefore, $$\left|\frac{v_{02}}{v_{01}}\right| = \frac{\sqrt{1-\cos 180°}}{\sqrt{1+\cos 180°}} = \infty$$

and the display angle $$\left(\psi = \frac{\theta}{2}\right) \text{ is } 90°$$

Since the display angle $\psi$ is equal to half the phase difference $\theta$ between the two sinusoids $V_a$ and $V_b$ and since $\theta$ is also a linear function of the time difference $\Delta t$ between pulses 9 and 10 within $\Delta t = \pm T_0/4$, the display angle $\psi$ is also a linear function of the time difference $\Delta t$ within the limits of $\pm T_0/4$.

By initially delaying pulse 10 one-quarter period, time coincident pulses give rise to a 45-degree display and thus afford means to determine which of the two pulses, 9 or 10, occurs first. This resolves any quadrantal ambiguity in direction finding applications. It can be shown that without the initial delay of $T_0/4$ given to pulse 10 that the display angle $\psi$ of the radial trace would be 45° for both 0° and 180° of signal arrival $\phi$.

The value of the ringing frequency $f_0$ of circuits 4 and 4a is determined by the relation $$\Delta t_0 = T_0/4 = \frac{1}{4f_0} \text{ or } f_0 = \frac{1}{4\Delta t_0}$$

where $\Delta t_0$ is the magnitude of the largest time difference to be measured. From this relation we can arrive at constants for use in a direction finding application as shown in the following table.

*Table I*

| Antenna Separation (d) | $\Delta t_0$ | $T_0$ | $f_0$ |
|---|---|---|---|
| | μsec. | μsec. | Mc |
| 100 ft | 0.1 | 0.4 | 2.50 |
| 250 ft | 0.25 | 1.0 | 1.00 |
| 500 ft | 0.5 | 2.0 | 0.50 |
| 1,000 ft | 1.0 | 4.0 | 0.25 |
| 2,000 ft | 2.0 | 8.0 | 0.125 |

Measurement Range: $-\Delta t_0 < \Delta t < +\Delta t_0$ when $\Delta t = 0$, $\psi = 45°$ From these tabulated values, it can be noted that $f_0 = 250/d$ ($f_0$ in megacycles and $d$ in feet).

Bearing in mind that the display angle $\psi$ is a linear function of the time difference ($\Delta t$) of signal arrival, the relation between display angle and angle of signal arrival can be readily obtained as follows:

From Equation 2:

$$\phi = \cos^{-1}\left(\frac{c}{d}\Delta t\right)$$

but $$\frac{d}{c} = \Delta t_0$$

(time of propagation between the two antennas)

$$\phi = \cos^{-1}\frac{\Delta t}{\Delta t_0} \quad (10)$$

Now the phase difference ($\theta$) between the two damped sinusoids is $$\theta = \Delta\theta + 90°$$

(takes into account the $T_0/4$ or 90° delay)

but $$\theta = \frac{\Delta t}{\Delta t_0}90°$$

$$\theta = \frac{\Delta t}{\Delta t_0}90° + 90°$$

$$= \left(1 + \frac{\Delta t}{\Delta t_0}\right)90°$$

But from (7) the display angle ($\psi$) is equal to $\theta/2$ $$\psi = \left(1 + \frac{\Delta t}{\Delta t_0}\right)45°$$

from which $$\frac{\Delta t}{\Delta t_0} = \frac{\psi}{45°} - 1$$

whence, from (10), $$\phi = \cos^{-1}\left(\frac{\psi}{45°} - 1\right) \quad (11)$$

The following table is illustrative of Equation 11.

| Angle of Arrival $\phi$ | Display Angle $\psi$ |
|---|---|
| Degrees | Degrees |
| 0 | 90 |
| 60 | 67.5 |
| 90 | 45 |
| 120 | 22.5 |
| 180 | 0 |

Connections to the plates can be interchanged whereupon the order of display is reversed, i.e., an ascending order of $\psi$ becomes associated with an ascending order of $\phi$.

The circuit of Fig. 3 shows a first antenna 1a and a second antenna 2a. Antenna 1a is coupled to a first crystal detector 12 and antenna 2a is coupled to a second crystal detector 12a. The demodulated output of the crystal detector 12 is coupled by means of potentiometer 14 to the ringing circuit 4. The output of the detector 12a is fed to a delay circuit 15 where it is delayed for the time equal to $T_0/4$ and is then fed into the ringing circuit 4a. The demodulated pulses 9 from antenna 1a upon amplification in pentode 6, shock excite the inductance 7 and capacitance 8 circuit and form a train of damped sinusoids $v_a$. Each sinusoid is initiated by the rise of the pulse and persists for an appreciable time before decaying to $$\frac{1}{e}$$

of its initial amplitude. The damped sinusoids are coupled to a cathode follower triode 16 whose output is delivered to the primary of a high frequency transformer 17 having provision for a balanced output. The demodulated pulses 10 from antenna 2a after being delayed in the delay circuit 15 are applied to shock excite the ringing circuit 4a in exactly the same manner as was done with the demodulated pulse 9 of antenna 1a in the ringing circuit 4, with the result that a train of damped sinusoids $v_b$ is formed and appears at the center tap of the secondary 19a of transformer 17a. When the secondaries are connected as shown, a vector summation takes place with the resulting voltages with respect to ground having the value shown at the output terminals 20 and 21 of the secondary 19 of the transformer 17. The resulting two voltages are separately amplified in amplifiers 22 and 22a. It is required only that each amplifier 22 and 22a be capable of amplifying $f_0$ and the sideband content of the damped sinusoidal envelope without distortion because the desired time difference resides only in the relative amplitude of the envelope waveform. The envelope of $v_a + v_b$ is extracted by the detector 23, the capacitor 24, shunted by the D.C. return resistance 25 serving to integrate the demodulated components of the detector 23 with the result that only the envelope remains. Similarly the envelope of $-v_a + v_b$ is obtained by detection and integration of the amplified output of amplifier 22a. Depending upon the shape and duration of the demodulated signal pulses, the envelope waveforms have various degrees of complexity. However, these waveforms are identical and differ only in relative amplitude after the vector sum and difference of the ringing frequency have been formed. Therefore, the ratio of the instantaneous envelope values (which determine the display angle $\psi$) is unaffected. These envelope voltages are applied to the X and Y plates of the cathode ray tube 11 for display purposes; either as shown in Fig. 3 or with connections interchanged.

Figure 4:
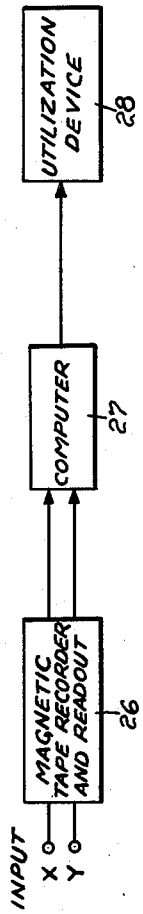
Fig. 4 is a block diagram of a recording and readout utilization of the desired angular information.

Another embodiment of this invention wherein the desired angular information is recorded and stored for readout at a later time when required is shown in Fig. 4. The output of the envelope detectors 23 and 23a shown in Fig. 3 is disconnected from the display tube 11 at points X and Y, and connections are made to a magnetic tape recorder and read-out device 26. The tape can be stored for use at a later time or the information thereon can be read out immediately. The output of the tape is fed into a computer such as, for example, the LPG-30 Computer manufactured by the Royal McBee Corporation, Hartford, Connecticut. This type of computer can be modified by suitable programming to determine the ratio of the two envelope voltage outputs of the detectors 23 and 23a and then compute the angle of signal arrival according to the equation $$\phi = \cos^{-1}\left(\frac{\psi}{45°} - 1\right)$$

where $$\psi = \tan^{-1}\frac{(\text{envelope of } -v_a + v_b)}{(\text{envelope of } v_a + v_b)}$$

$$\left[\text{also } \psi = \tan^{-1}\frac{(\text{average of } -v_a + v_b)}{(\text{average of } v_a + v_b)}\right]$$

The output of the computer can then be fed into any utilization device 28 to produce coded information on, for instance, punched cards or similar recording devices or a visual display.

Typical parameters used in the circuit of this invention, the ringing frequency of the circuit being 2.5 mc., are as follows:

Capacitors:
```
    C1, C1a, C3, C3a, C4, C4a, C6, C6a____μfd__   .1
    C2, C2a _____μμfd__  185
    C5, C5a_____μfd__  .001
```
Diodes:
```
    CR1, CR1a_____ IN82
    CR2, CR2a_____ IN34A
```
Inductance:
```
    L1, L1a _____μh__  22
```
Resistors:
```
    R1, R1a_____ohms__    50
    R2, R2a_____ohms (variable)__    200
    R3, R3a_____ohms__   180
    R4, R4a_____do____  100K
    R5, R5a, R6, R6a_____do____  1000
    R7, R7a_____do____   33K
```
Transformer:
    T1, T1a___ Sprague pulse transformer #152 1:3 ratio
Tubes:
```
    V1, V1a_____ 6AK5
    V2, V2a_____ ½ 5687
```

It will be understood, of course, that these circuit values are given here to illustrate a system for use with two antennas spaced a certain distance apart (100 feet, in this case). The circuit obviously being useful for other antenna spacings by merely changing certain of the parameters. Not shown, but applicable in certain versions of the circuit in Fig. 3, would be provision for Z-axis intensification of the display and means for equalization of the pulse amplitudes before introduction into the ringing circuits.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio direction finding system to determine the angle of arrival of a pulsed electromagnetic radiation comprising a source of pulsed electromagnetic radiations, first and second spaced antenna means to receive pulsed radiations, means to convert a pulsed radiation received by said first antenna means to a first sinusoidal signal, means to convert a pulsed radiation received by said second antenna means to a second sinusoidal signal, means to obtain from said first and second sinusoidal signals sum and difference voltages, the ratio of which is a function of the phase difference between said first and second sinusoidal signals, and means to utilize said voltages to obtain an angular indication which has a given relationship to the time difference between the arrival of said pulsed radiation at said first and second antennas, said time difference being a function of said angle of arrival of said pulsed radiation at said first and second antenna means.

2. A radio direction finding system according to claim 1 wherein said means to convert the pulsed radiation received by said first and second antenna means to first and second sinusoidal signals include a first detector coupled to said first antenna means, a second detector coupled to said second antenna means, first oscillator means coupled to said first detector whereby the pulsed radiation received by said first antenna means is converted to a first train of damped sinusoidal waves, second oscillator means, a delay circuit coupling said second detector to said second oscillator means whereby the pulsed radiation received by said second antenna means is converted into a second train of damped sinusoidal waves, said second train of damped sinusoidal waves being delayed in time with respect to said first train of damped sinusoidal waves.

3. A radio direction finding system according to claim 2 wherein said first and second oscillator means each includes an electron discharge device, and an inductance shunted by a capacitance coupled to the output of said electron discharge device.

4. A radio direction finding system according to claim 3 wherein the circuit parameters of said electron discharge device, inductance and capacitance of said first and second oscillator means are substantially equal, and the Q of said inductances and the ringing frequencies of said first and second oscillator means are equal.

5. A radio direction finding system according to claim 2 wherein said means to obtain from said first and second sinusoidal signals sum and difference voltages comprise a first transformer, a first amplifier coupling the output of said first oscillator means to the primary of said first transformer, a second transformer, a second amplifier coupling the output of said second oscillator means to the primary of said second transformer, means coupling the output of said second transformer to the secondary of said first transformer whereby the output of said first transformer is the sum and difference voltages of said first and second sinusoidal voltages.

6. A radio direction finding system according to claim 1 wherein said means to utilize said sum and difference voltages include a first envelope detector to detect the rectified envelope voltage of said sum voltage and a second envelope detector to detect the rectified envelope voltage of said difference voltage.

7. A radio direction finding system according to claim 6 wherein said utilization means further includes a cathode ray electron discharge device, means to apply said rectified envelope voltage of said sum voltage to one pair of deflection plates of said cathode ray electron discharge device, means to apply said rectified envelope voltage of said difference voltage to the other pair of deflection plates of said cathode ray electron discharge device to secure a visible angular indication on the display signal of said cathode ray electron discharge device, said angular indication being a function of the ratio of said envelope voltage of said sum voltage and the envelope voltage of said difference voltage.

8. A radio direction finding system according to claim 6 wherein said utilization means further include magnetic tape recording and readout means to record on said magnetic tape the rectified envelope voltage of said sum voltage and the rectified envelope voltage of said difference voltage, means to couple the output of said tape recording and readout device to computing means to determine the angle of signal arrival of said pulsed radiation from the ratio of said rectified envelope sum voltage and said rectified difference voltage and utilization means coupled to said computing means to produce information indicating said angle of signal arrival.

9. A radio direction finding system to determine the angle of arrival of pulsed electromagnetic radiations comprising a source of pulsed electromagnetic radiations, first and second spaced antenna means to receive said pulsed radiations, a first detector to detect the pulse envelope of said pulsed radiations arriving at said first antenna means, a second detector to detect the pulse envelope of said pulsed radiations arriving at said second antenna means, a first oscillator means, means coupling the output of said first detector to the input of said first oscillator means, a second oscillator means, a delay circuit coupling the output of said second detector to the input of said second oscillator means, said first and second oscillator means each including an electron discharge device of the same type having at least three electrodes, an inductance shunted by a capacitance coupled to the output of said electron discharge device whereby said first oscillator means converts the pulsed output of said first detector to a first train of damped sinusoidal waves and said second oscillator means converts the pulsed output of said second detector means to a second train of damped sinusoidal waves delayed in time with respect to said first train of damped sinusoidal waves, the electrical characteristics of said first and second oscillator means being substantially identical so that the damping coefficient $$\epsilon^{\frac{-w_0 t}{2Q_0}}$$

of each of said first and second oscillator means is equal, means to obtain from said first and second trains of damped sinusoidal waves the sum and difference voltages of said first and second train of damped sinusoidal waves, means to obtain the rectified envelope voltage of said sum voltage, means to obtain the rectified envelope voltage of said difference voltage the ratio of said sum and difference voltages being a function of the phase difference between said first and second trains of damped sinusoidal waves, a cathode ray electron discharge device, means to apply the rectified sum envelope voltage to one pair of deflection plates of said cathode ray electron discharge device, means to apply the rectified difference envelope voltage to the other pair of deflection plates of said cathode ray electron discharge device to obtain an angular indication which has a given relationship to the time difference between the arrival of said pulsed radiations at said first and second antennas, said time difference being a function of said angle of arrival of said pulsed radiations at said first and second antennas.

10. A radio direction finding system to determine the angle of arrival of pulsed electromagnetic radiations comprising a source of pulsed electromagnetic radiations, first and second spaced antenna means to receive said pulsed radiations, a first detector to detect the pulse envelope of said pulsed radiations arriving at said first antenna means, a second detector to detect the pulse envelope of said pulsed radiations arriving at said second antenna means, a first oscillator means, means coupling the output of said first detector to the input of said first oscillator means, a second oscillator means, a delay circuit coupling the output of said second detector to the input of said second oscillator means, first amplifier means coupling the output of said first oscillator means to the primary of said first transformer, a second pulse transformer, second amplifier means coupling the output of said second oscillator means to the primary of said second transformer, a first resistive network coupled across the secondary of said first transformer, a second resistive network coupled across the secondary of said second transformer, means coupling the output of said second transformer to the mid-point of said first resistive network whereby there is secured as the output of said second transformer the sum and difference voltages of said first and second train of damped sinusoidal waves, a first envelope detector, third amplifying means coupling the sum voltage output of said first transformer to the input of said first envelope detector to secure as the output of said first envelope detector the rectified envelope voltage of said sum voltage, a second envelope detector, fourth amplifying means coupling the difference voltage output of said first transformer to the input of said second envelope detector to secure as the output of said second envelope detector the rectified envelope voltage of said difference voltage, the ratio of said sum and difference voltages being a function of the phase difference between said first and second trains of damped sinusoidal waves, a cathode ray electron discharge device, means to apply the rectified sum envelope voltage to one pair of deflection plates of said cathode ray electron discharge device, means to apply the rectified difference envelope voltage to the other pair of deflection plates of said cathode ray electron discharge device to obtain an angular indication which has a given relationship to the time difference between the arrival of said pulsed radiations at said first and second antennas, said time difference being a function of said angle of arrival of said pulsed radiations at said first and second antennas.

11. A radio direction finding system to determine the angle of arrival of pulsed electromagnetic radiations comprising a source of pulsed electromagnetic radiations, first and second spaced antenna means to receive said pulsed radiations, a first detector to detect the pulse envelope of said pulsed radiations arriving at said first antenna means, a second detector to detect the pulse envelope of said pulsed radiations arriving at said second antenna means, a first oscillator means, means coupling the output of said first detector to the input of said first oscillator means, a second oscillator means, a delay circuit coupling the output of said second detector to the input of said second oscillator means whereby said first oscillator means converts the pulsed output of said first detector to a first train of damped sinusoidal waves and said second oscillator means converts the pulsed output of said second detector means to a second train of damped sinusoidal waves delayed in time with respect to said first train of damped sinusoidal waves, the electrical characteristics of said first and second oscillator means being substantially identical so that the damping coefficient $$\epsilon^{\frac{-w_0 t}{2Q_0}}$$

of each of said first and second oscillator means is equal, a first pulse transformer, first amplifier coupling the output of said first oscillator means to the primary of said first transformer, a second pulse transformer, second amplifier means coupling the output of said second oscillator means to the primary of said second transformer, a first resistive network coupled across the secondary of said first transformer, a second resistive network coupled across the secondary of said second transformer, means coupling the output of said second transformer to the mid-point of said first resistive network whereby there is secured as the output of said second transformer the sum and difference voltages of said first and second train of damped sinusoidal waves, a first envelope detector, third amplifying means coupling the sum voltage output of said first transformer to the input of said first envelope detector to secure as the output of said first envelope detector the rectified envelope voltage of said sum voltage, a second envelope detector, fourth amplifying means coupling the difference voltage output of said first transformer to the input of said second envelope detector to secure as the output of said second envelope detector the rectified envelope voltage of said difference voltage, the ratio of said sum and difference voltages being a function of the phase difference between said first and second trains of damped sinusoidal waves, a cathode ray electron discharge device, means to apply the rectified sum envelope voltage to one pair of deflection plates of said cathode ray electron discharge device, means to apply the rectified difference envelope voltage to the other pair of deflection plates of said cathode ray electron discharge device to obtain an angular indication which has a given relationship to the time difference between the arrival of said pulsed radiations at said first and second antennas, said time difference being a function of said angle of arrival of said pulsed radiations at said first and second antennas.

12. A radio direction finding system to determine the angle of arrival of pulsed electromagnetic radiations comprising a source of pulsed electromagnetic radiations, first and second spaced antenna means to receive said pulsed radiations, a first detector to detect the pulse envelope of said pulsed radiations arriving at said first antenna means, a second detector to detect the pulse envelope of said pulsed radiations arriving at said second antenna means, a first oscillator means, means coupling the output of said first detector to the input of said first oscillator means, a second oscillator means, a delay circuit coupling the output of said second detector to the input of said second oscillator means, said first and second oscillator means each including an electron discharge device of the same type having at least three electrodes, an inductance shunted by a capacitance coupled to the output of said electron discharge device whereby said first oscillator means converts the pulsed output of said first detector to a first train of damped sinusoidal waves and said second oscillator means converts the pulsed output of said second detector means to a second train of damped sinusoidal waves delayed in time with respect to said first train of damped sinusoidal waves, the electrical characteristics of said first and second oscillator means being substantially identical so that the damping coefficient $$\epsilon^{\frac{-w_0 t}{2Q_0}}$$

of each of said first and second oscillator means is equal, a first pulse transformer, first amplifier means coupling the output of said first oscillator means to the primary of said first transformer, a second pulse transformer, second amplifier means coupling the output of said second oscillator means to the primary of said second transformer, a first resistive network coupled across the secondary of said first transformer, a second resistive network coupled across the secondary of said second transformer, means coupling the output of said second transformer to the mid-point of said first resistive network whereby there is secured as the output of said second transformer the sum and difference voltages of said first and second train of damped sinusoidal waves, a first envelope detector, third amplifying means coupling the sum voltage output of said first transformer to the input of said first envelope detector to secure as the output of said first envelope detector the rectified envelope voltage of said sum voltage, a second envelope detector, fourth amplifying means coupling the difference voltage output of said first transformer to the input of said second envelope detector to secure as the output of said second envelope detector the rectified envelope voltage of said difference voltage, the ratio of said sum and difference voltages being a function of the phase difference between said first and second trains of damped sinusoidal waves, means to apply the rectified sum envelope voltage and the rectified difference envelope voltage to computer means to obtain an angular indication which has a given relationship to the time difference between the arrival of said pulsed radiations at said first and second antennas, said time difference being a function of said angle of arrival of said pulsed radiations at said first and second antennas.

13. A radio direction finding system to determine the angle of arrival of pulsed electromagnetic radiations comprising a source of pulsed electromagnetic radiations, first and second spaced antenna means to receive said pulsed radiations, a first detector to detect the pulse envelope of said pulsed radiations arriving at said first antenna means, a second detector to detect the pulse envelope of said pulsed radiations arriving at said second antenna means, a first oscillator means, means coupling the output of said first detector to the input of said first oscillator means, a second oscillator means, a delay circuit coupling the output of said second detector to the input of said second oscillator means, said first and second oscillator means each including an electron discharge device of the same type having at least three electrodes, an inductance shunted by a capacitance coupled to the output of said electron discharge device whereby said first oscillator means converts the pulsed output of said first detector to a first train of damped sinusoidal waves and said second oscillator means converts the pulsed output of said second detector means to a second train of damped sinusoidal waves delayed in time with respect to said first train of damped sinusoidal waves, the electrical characteristics of said first and second oscillator means being substantially identical so that the damping coefficient $$\epsilon^{\frac{-w_0 t}{2Q_0}}$$

of each of said first and second oscillator means is equal, a first pulse transformer, first amplifier means coupling the output of said first oscillator means to the primary of said first transformer, a second pulse transformer, second amplifier means coupling the output of said second oscillator means to the primary of said second transformer, a first resistive network coupled across the secondary of said first transformer, a second resistive network coupled across the secondary of said second transformer, means coupling the output of said second transformer to the mid-point of said first resistive network whereby there is secured as the output of said second transformer the sum and difference voltages of said first and second trains of damped sinusoidal waves, a first envelope detector, third amplifying means coupling the sum voltage output of said first transformer to the input of said first envelope detector to secure as the output of said first envelope detector the rectified envelope voltage of said sum voltage, a second envelope detector, fourth amplifying means coupling the difference voltage output of said first transformer to the input of said second envelope detector to secure as the output of said second envelope detector the rectified envelope voltage of said difference voltage, the ratio of said rectified sum envelope voltage and rectified difference envelope voltage being a function of the phase difference between said first and second trains of damped sinusoidal waves, a cathode ray electron discharge device, means to apply the rectified sum envelope voltage to one pair of deflection plates of said cathode ray electron discharge device, means to apply the rectified difference envelope voltage to the other pair of deflection plates of said cathode ray electron discharge device to obtain an angular indication which has a given relationship to the time difference between the arrival of said pulsed radiations at said first and second antennas, said time difference being a function of said angle of arrival of said pulsed radiations at said first and second antennas.

References Cited in the file of this patent

UNITED STATES PATENTS 2,631,279   Bollinger et al. _____ Mar. 10, 1953